United States Patent
Nakahara et al.

(10) Patent No.: US 7,873,848 B2
(45) Date of Patent: Jan. 18, 2011

(54) METHOD FOR RAPIDLY SHIFTING A COMMUNICATION APPARATUS TO A POWER SAVE MODE IN AN ADHOC NETWORK

(75) Inventors: Masanori Nakahara, Chigasaki (JP); Hiroshi Mashimo, Tokyo (JP); Kazutoshi Hara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 713 days.

(21) Appl. No.: 11/573,643

(22) PCT Filed: Sep. 16, 2005

(86) PCT No.: PCT/JP2005/017553

§ 371 (c)(1), (2), (4) Date: Feb. 12, 2007

(87) PCT Pub. No.: WO2006/033421

PCT Pub. Date: Mar. 30, 2006

(65) Prior Publication Data

US 2007/0207765 A1     Sep. 6, 2007

(30) Foreign Application Priority Data

Sep. 21, 2004   (JP) ............................. 2004-273132

(51) Int. Cl.
- G06F 1/26 (2006.01)
- G06F 1/32 (2006.01)
- G08C 17/00 (2006.01)
- H04J 3/16 (2006.01)

(52) U.S. Cl. .................. 713/320; 713/300; 370/311; 370/318; 370/468

(58) Field of Classification Search .............. 713/300, 713/320; 370/311, 318, 468
See application file for complete search history.

(56) References Cited

U.S. PATENT DOCUMENTS 6,463,307 B1   10/2002 Larsson et al.

(Continued)

FOREIGN PATENT DOCUMENTS

CN   1323495 A   11/2001

(Continued)

OTHER PUBLICATIONS

IEEE Std 802.11-1997, "Information technology—Telecommunications and information exchange between systems—Local and metropolitan area networks—Special requirements—Part 11: Wireless LAN Medium Access Control (MAC) and Physical Layer (PHY) Specifications", Jun. 26, 1997, pp. 22, 34-37, 133-136.

(Continued)

*Primary Examiner*—Thomas Lee
*Assistant Examiner*—Vincent T Tran
(74) *Attorney, Agent, or Firm*—Fitzpatrick, Cella, Harper & Scinto

(57) ABSTRACT

Power saving cannot be implemented in the adhoc mode by only the IEEE 802.11 standard. This is because communication partners mutually utilize the power save mode in the adhoc mode, and their states must always be managed. In the adhoc mode, the number of communication partners is not always one, and all stations which join a network are candidates, increasing the load of implementation. To solve this problem, a communication apparatus notifies a change to power save mode by an ATIM packet, RTS packet, or null packet. When the ATIM packet or RTS packet is transmitted, the communication apparatus can notify the partner of a change in mode regardless of whether the partner is in the power save mode. When the null packet is transmitted, the communication apparatus can rapidly notify the partner without waiting for any beacon.

10 Claims, 17 Drawing Sheets

U.S. PATENT DOCUMENTS

| | | | |
|---|---|---|---|
| 6,564,074 B2 * | 5/2003 | Romans | 455/574 |
| 7,542,437 B1 * | 6/2009 | Redi et al. | 370/311 |
| 7,555,056 B2 * | 6/2009 | Hara et al. | 375/295 |
| 2002/0054584 A1 | 5/2002 | Dempo | 370/338 |
| 2002/0132603 A1 * | 9/2002 | Lindskog et al. | 455/343 |
| 2004/0097268 A1 | 5/2004 | Kurokawa et al. | |
| 2004/0105401 A1 * | 6/2004 | Lee | 370/311 |
| 2005/0047357 A1 * | 3/2005 | Benveniste | 370/311 |
| 2005/0085261 A1 | 4/2005 | Sugaya | 455/552.1 |
| 2005/0270993 A1 * | 12/2005 | Rajamani et al. | 370/311 |
| 2006/0203833 A1 | 9/2006 | Hara et al. | 370/401 |
| 2006/0212732 A1 | 9/2006 | Mashimo et al. | 713/300 |
| 2006/0251004 A1 * | 11/2006 | Zhong et al. | 370/318 |
| 2007/0217332 A1 | 9/2007 | Nakahara | 340/506 |
| 2008/0194201 A1 * | 8/2008 | Sinivaara et al. | 455/41.2 |

FOREIGN PATENT DOCUMENTS

| | | |
|---|---|---|
| JP | 2002-152277 | 5/2002 |
| JP | 2005-101756 | 4/2005 |
| WO | 00/10353 A1 | 2/2000 |

OTHER PUBLICATIONS

Hideaki Matsue, et al, "802.11 High-speed Wireless LAN Textbook", Kabushikikaisya IDG Japan, Mar. 29, 2003, ISBN4-87280-490-2, p. 64.

U.S. Appl. No. 11/660,768, filed Feb. 22, 2007 by Hiroshi Mashimo, Masanori Nakahara and Kazutoshi Hara.

Written Opinion of the International Searching Authority in corresponding International Application No. PCT/JP/2005/017553, dated Dec. 20, 2005.

Yu-Chee Tseng, et al., "Power-Saving Protocols for IEEE 802.11-Based Multi-Hop Ad Hoc Networks", IEEE INFOCOM, 2002, pp. 200-209.

European Search Report dated Dec. 23, 2009 in corresponding European Application No. 05785779.9.

"Part 11: Wireless LAN Medium Access Control (MAC) and Physical Layer (PHY) Specifications", IEEE Std 802.11, 1997, pp. 132-136.

Chinese Office Action dated Jan. 29, 2010 in corresponding application CN 200580031784.3.

* cited by examiner

FIG. 10

| MAC ADDRESS | EXPIRATION TIME |
|---|---|
| 00:01:02:03:04:05 | 100 |

| MAC ADDRESS | POWER MODE | EXPIRATION TIME |
|---|---|---|
| 00:01:02:03:04:05 | ACTIVE | 100 |

~1301

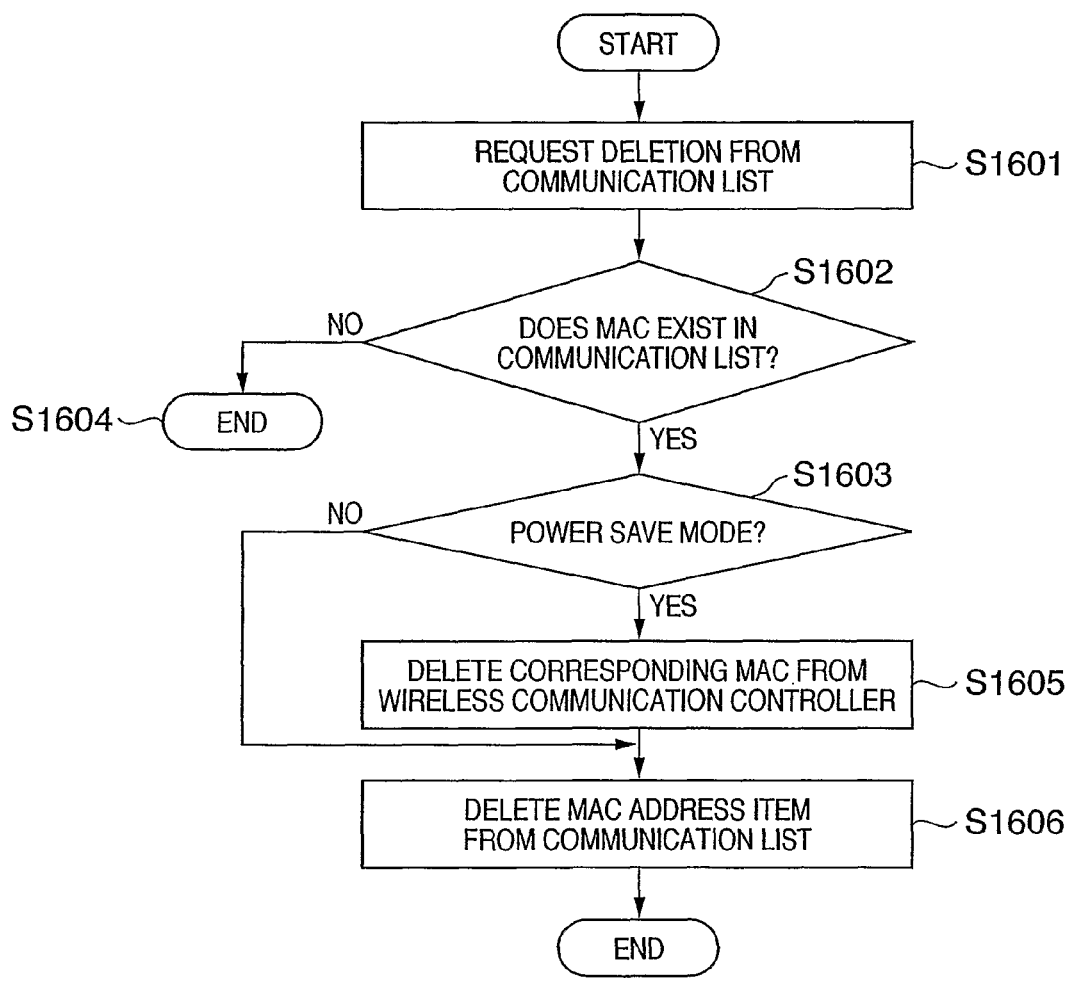
F I G. 16

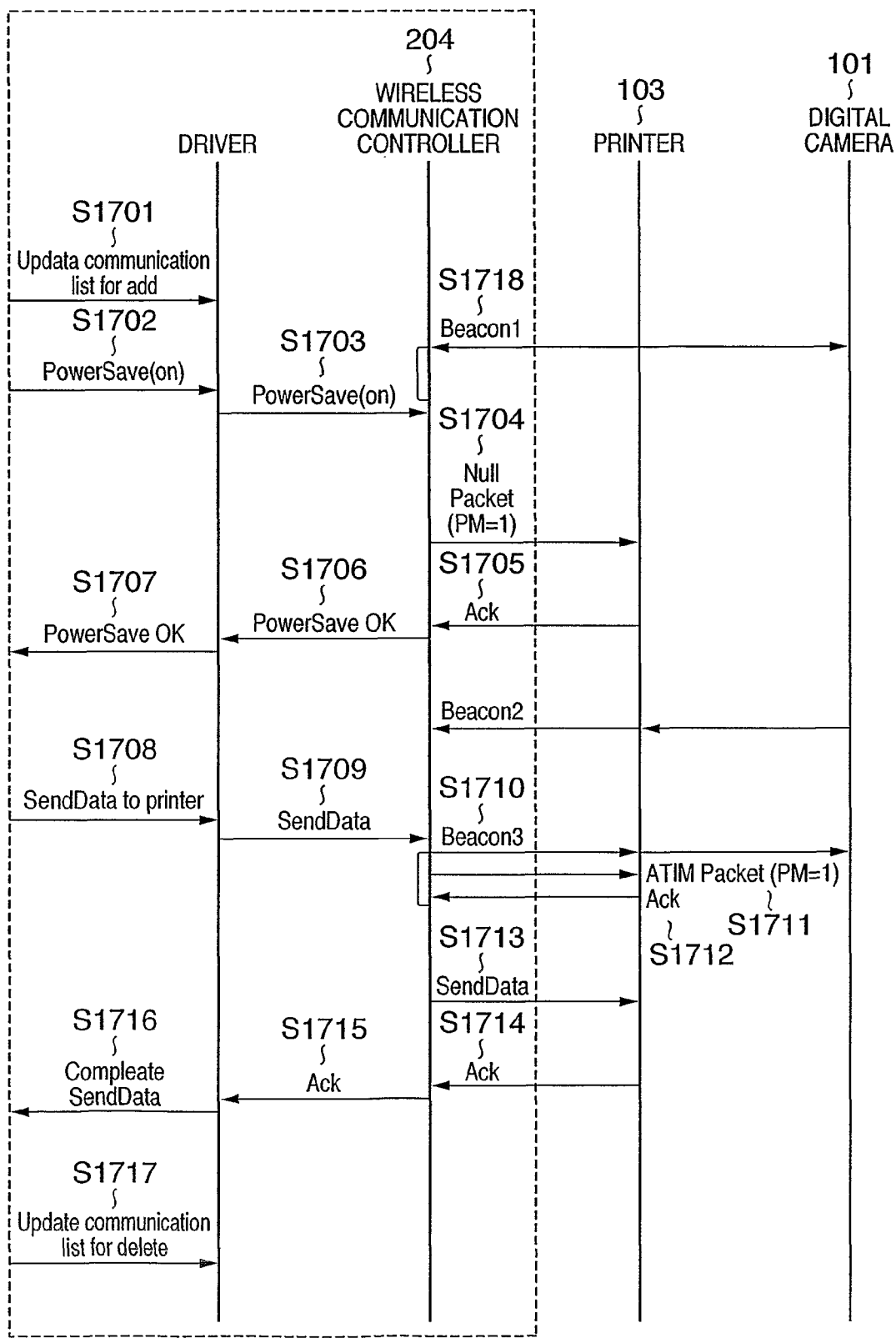

METHOD FOR RAPIDLY SHIFTING A COMMUNICATION APPARATUS TO A POWER SAVE MODE IN AN ADHOC NETWORK

TECHNICAL FIELD

The present invention relates to a communication apparatus and communication method and, more particularly, to a technique of notifying a communication partner of, e.g., a change to power save mode.

BACKGROUND ART

Recently, many wireless devices having IEEE 802.11 wireless interfaces have been commercialized and become available. Such a wireless device generally provides high portability, and is often used in a portable device. Most of portable devices are driven by a battery, and it is, therefore, important to reduce battery consumption and prolong the service life of the battery.

The IEEE 802.11 standard defines a power save mode specification in which transmission and reception are intermittently executed using the fact that an actual communication time is discontinuous even when a wireless interface is effective. The IEEE 802.11 standard proposes an infrastructure mode in which a communication device (station) communicates with another communication device via an access point serving as a base station, and an adhoc mode in which stations communicate with each other. In the power save mode specification, the infrastructure mode is defined in detail by the IEEE 802.11 standard, and has already been employed and used in many products. To the contrary, the power save mode specification in the adhoc mode is still indefinite, and has not been adopted in products.

A large difference between the infrastructure mode and the adhoc mode is as follows. In the infrastructure mode, an access point is always a communication partner and can not utilize the power save mode (is always in the active mode). To the contrary, in the adhoc mode, even a station serving as a communication partner may utilize the power save mode, and data must always be transmitted in consideration of the state of the partner.

When the IEEE 802.11 power save mode is used, a station can take two states: an Awake state and Sleep state. The station can transmit/receive data in the Awake state, but cannot transmit/receive any data in the Sleep state. If the station wants to change its power mode in the adhoc mode, it must notify a communication partner of the power mode after checking the partner's state. This is because, if the station notifies the communication partner of a change in power mode while the communication partner cannot receive any packet, i.e., is in the Sleep state, the communication partner cannot recognize the change in power mode. In this manner, the state of a communication partner must be managed in the adhoc mode, the mechanism is complicated, and thus the adhoc mode has not been put into practical use.

As described above, it is difficult to implement power saving in the adhoc mode. This is because a communication partner can utilize the power save mode in the adhoc mode and each station must always manage the state of a communication partner.

In the adhoc mode, the number of communication partners is not always one, and all stations which join a network are candidates. No proposal has been made to permit even a simple implementation in accordance with the load of implementation and implement power saving while considering communication with all stations.

It is also possible to notify a communication partner of a change in power mode by a beacon. In the adhoc mode, a station which notifies a communication partner of a change in mode cannot always immediately transmit a beacon, and the mode change notification cannot be issued quickly. As a result, the change in power mode delays, and it becomes difficult to reduce power consumption.

DISCLOSURE OF INVENTION

It is an object of the present invention to rapidly, efficiently manage the power mode.

It is another object of the present invention to allow, for example, even a communication apparatus which performs adhoc communication to rapidly shift to the power save mode.

It is still another object of the present invention to reduce reception errors of a partner even when a device which forms an adhoc network changes to the power save mode.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 10 is a table showing the structure of a power save list according to the first embodiment;

FIG. 13 is a table showing the structure of a communication list according to the second embodiment;

FIG. 16 is a flowchart showing the communication list update algorithm according to the second embodiment; and FIG. 17 is a sequence chart by a digital camera 102 according to the third embodiment.

BEST MODE FOR CARRYING OUT THE INVENTION

First Embodiment

Figure 1:
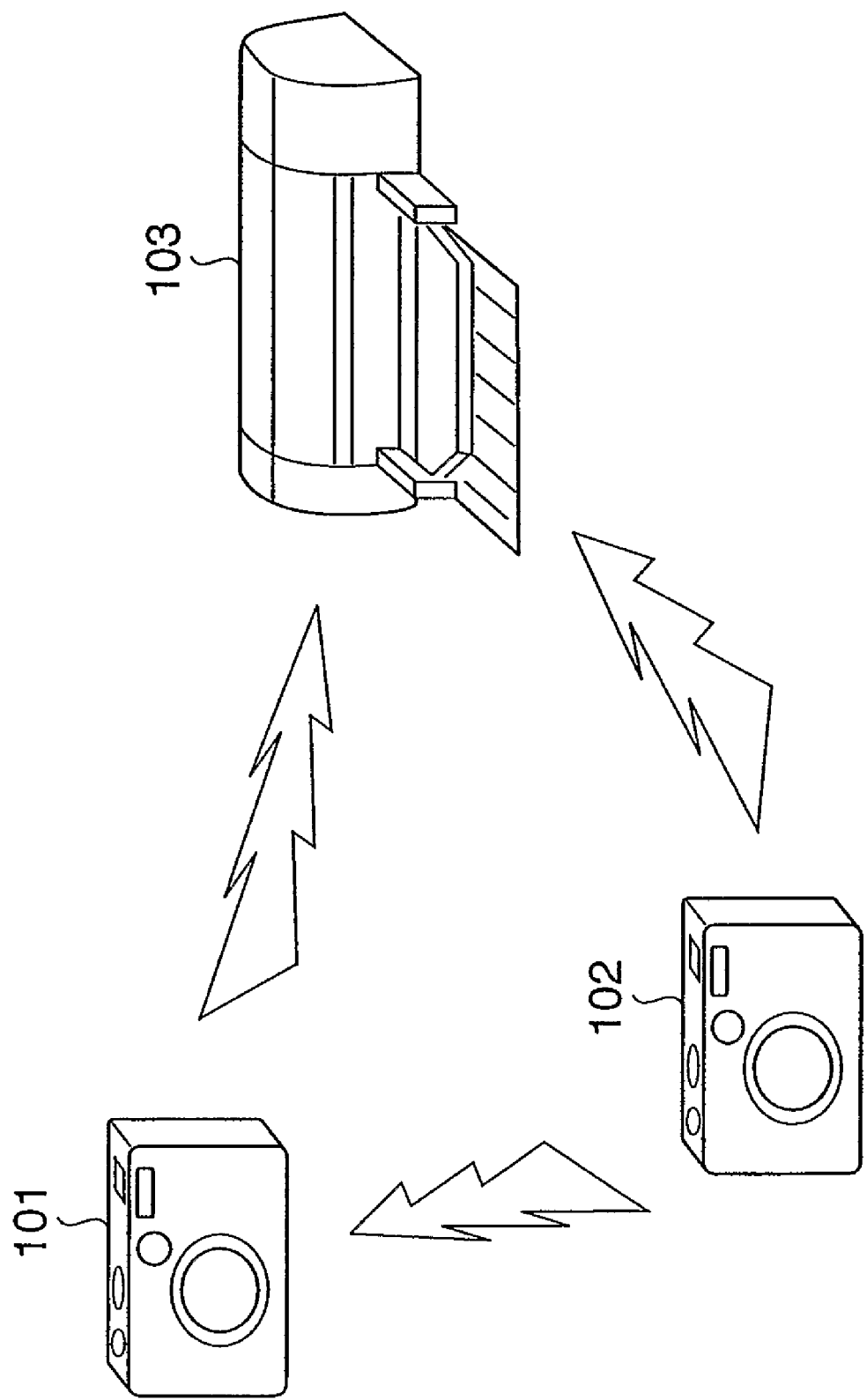
FIG. 1 is a view showing the configuration of the adhoc network of wireless devices according to an embodiment.

As an example in which three stations (STAs) form an adhoc network, the first embodiment will describe a case wherein digital cameras 101 and 102 join an adhoc network formed by a printer 103. FIG. 1 shows the connections of the devices according to the first embodiment. The digital cameras can transfer images via their wireless interfaces, and the printer can transfer and print via a wireless interface an image which is requested by the digital camera to be printed.

Figure 2:
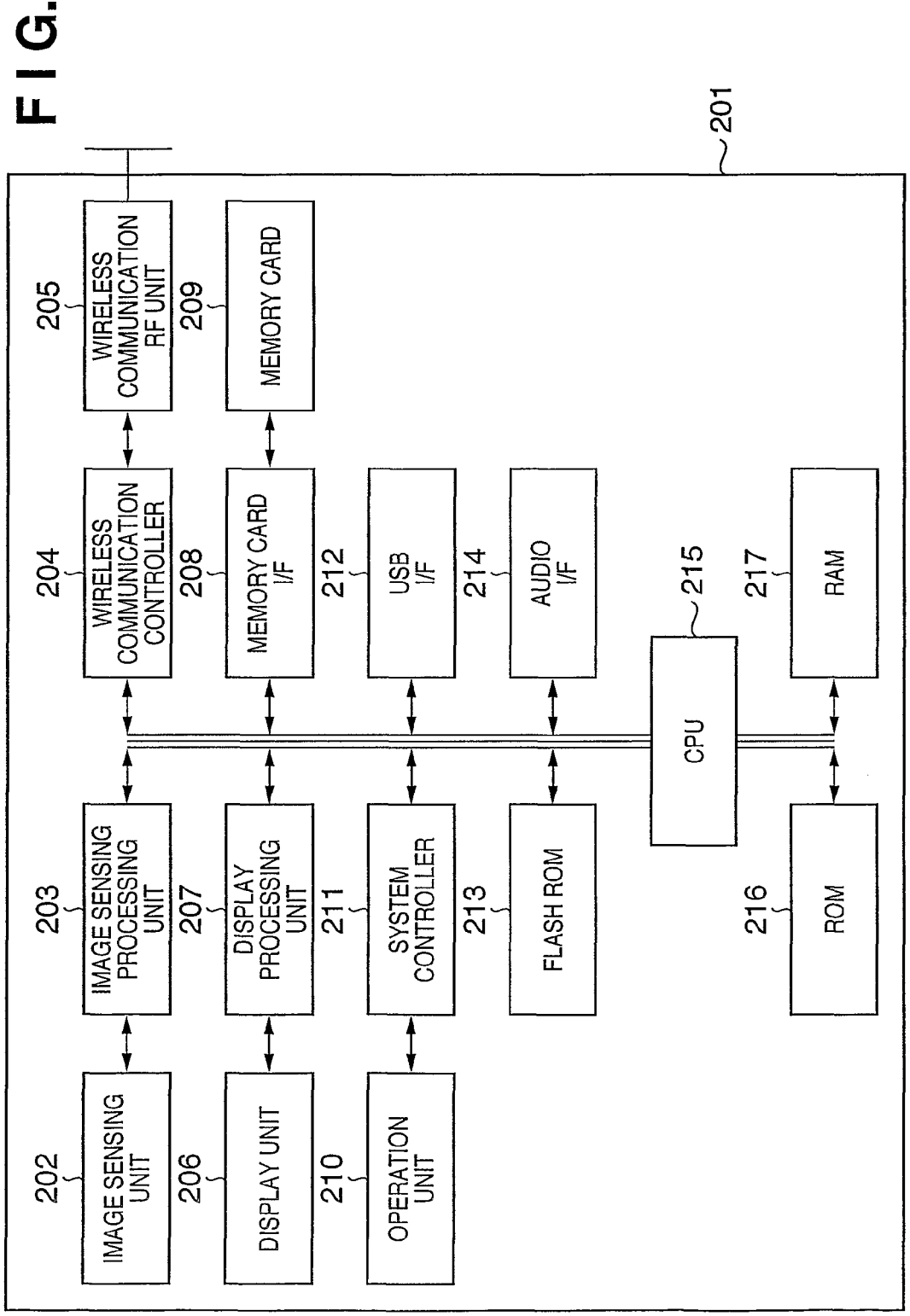
FIG. 2 is a block diagram showing the configuration of digital cameras 101 and 102 according to the embodiment.

FIG. 2 is a functional block diagram showing the digital camera according to the first embodiment. In the first embodiment, the digital cameras 101 and 102 have the same functional blocks. An operation unit 210 of the digital camera is connected to a CPU 215 via a system controller 211, and includes the shutter switch and various keys of the digital camera. An image sensing unit 202 is a block which senses an image when the shutter is pressed, and a sensed image is processed by an image sensing processing unit 203. A display unit 206 is a block which displays information to the user (e.g., LCD display, LED display, and audio indication), and the display contents of the display unit 206 are controlled by a display processing unit 207. An operation such as selection from information displayed on the display unit 206 is performed in cooperation with the operation unit 210. That is, the display unit 206 and operation unit 210 construct a user interface.

A memory card I/F 208 is used to connect a memory card 209, a USB I/F 212 is used to connect an external device via a USB, and an audio I/F 214 is used to exchange an audio signal with an external device. These functional units shown in the block diagram of FIG. 2 are processed under the control of the CPU 215, and programs controlled by the CPU are stored in a ROM 216 or flash ROM 213. Data processed by the CPU 215 is written/read out in/from a RAM 217 or the flash ROM 213. The flash ROM 213 is a nonvolatile storage area. Note that sensed image data is written (saved) in the memory card 209 via the memory card I/F 208 after a well-known compression process.

A wireless communication RF unit 205 and wireless communication controller unit 204 construct a wireless interface. The wireless communication RF unit 205 comprises a hardware block which converts an analog signal received from an antenna into digital information, or converts digital information into an analog signal and transmits the analog signal from the antenna. The wireless communication controller unit 204 is formed from hardware which processes MAC layers for controlling communication and firmware for driving the MAC layers. The wireless communication controller unit 204 incorporates a flash ROM which can store a MAC address and the like.

These functional units shown in the block diagram of FIG. 2 are processed under the control of the CPU 215, and programs (drivers) controlled by the CPU 215 are stored in the ROM 216 or flash ROM 213. The firmware may be stored in a flash ROM or the like present in the wireless communication controller unit 204, or may be stored in the flash ROM 213 or ROM 216 of a digital camera 201 and loaded into the wireless communication controller unit 204 when the wireless interface is used. The flash ROM 213 stores parameters such as a network identifier ESSID and encryption key necessary for wireless communication. When the wireless interface is used, these parameter values are handed from the driver to the wireless communication controller unit to enable wireless communication.

Figure 3:
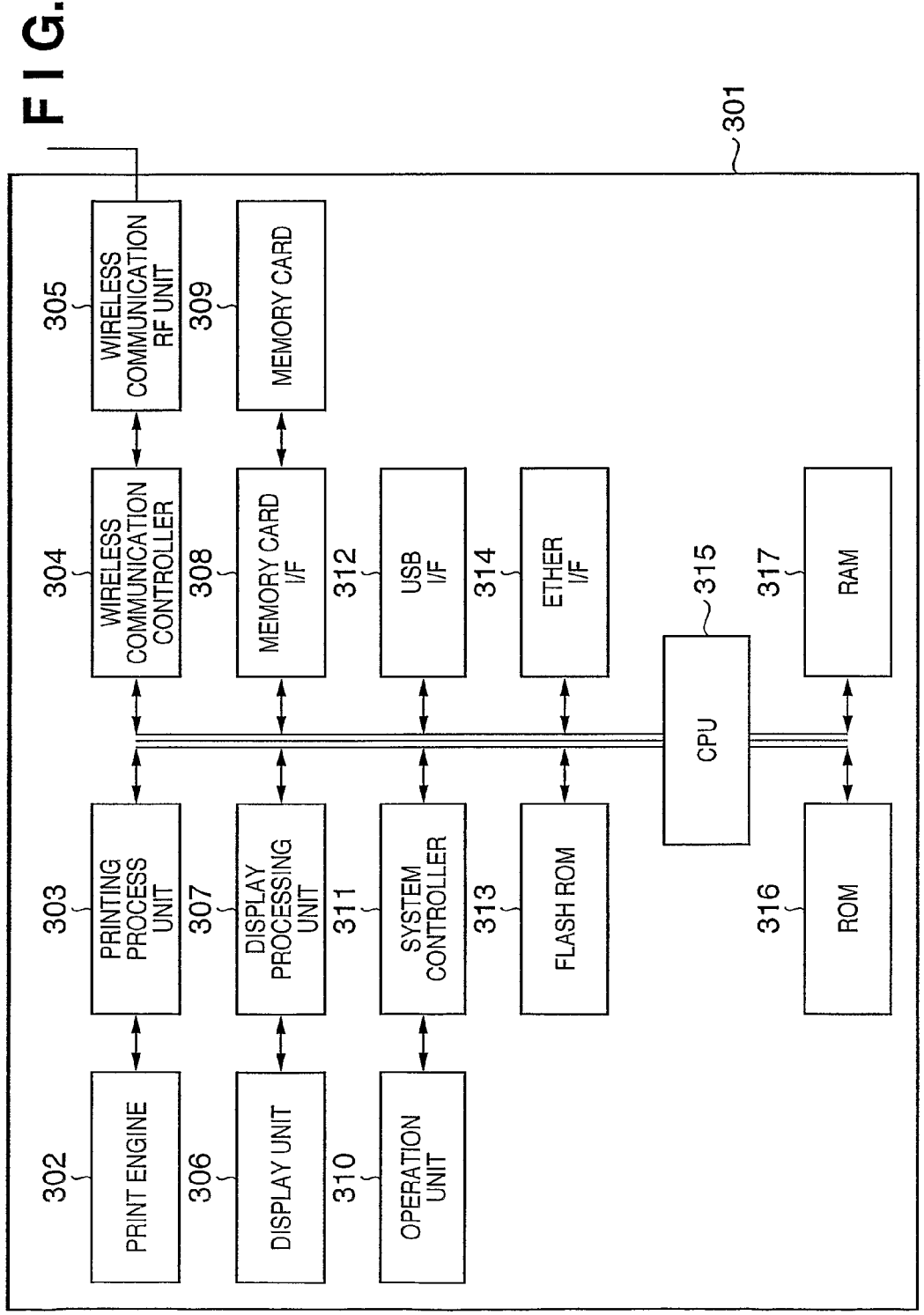
FIG. 3 is a block diagram showing the configuration of a printer 103 according to the embodiment.

FIG. 3 is a functional block diagram showing the printer according to the first embodiment. An operation unit 310 of a printer 301 is connected to a CPU 315 via a system controller 311. A print engine 302 is a functional block which actually prints an image on paper, and an image to be printed is processed by a printing process unit 303. The print engine is arbitrary, and in the first embodiment, the printer 103 shown in FIG. 1 is an inkjet printer which is mainly used in home and discharges ink droplets by thermal energy onto a printing medium such as a printing sheet.

A display unit 306 is a block which displays information to the user (e.g., LCD display, LED display, and audio indication), and the display contents of the display unit 306 are controlled by a display processing unit 307. An operation such as selection from information displayed on the display unit 306 is performed via the operation unit 310. That is, the display unit 306 and operation unit 310 construct a user I/F of the printer 301 in the first embodiment.

A memory card I/F 308 is used to connect a detachable memory card 309. A memory card which was mounted in a digital camera is inserted into the memory card I/F 308, and then a sensed image can be printed.

A USB I/F 312 is used to connect an external device via a USB, and an ETHERNET I/F 314 is used to connect an external device by using ETHERNET communication. These functional units shown in the block diagram of FIG. 3 are processed under the control of the CPU 315, and programs controlled by the CPU 315 are stored in a ROM 316 or flash ROM 313. Data processed by the CPU 315 is written/read out in/from a RAM 317 or the flash ROM 313. The flash ROM 313 is a nonvolatile storage area.

A wireless communication RF unit 305 and wireless communication controller unit 304 construct a wireless interface. The wireless communication RF unit 305 comprises a hardware block which converts an analog signal received from an antenna into digital information, or converts digital information into an analog signal and transmits the analog signal from the antenna. The wireless communication controller unit 304 is formed from hardware which processes MAC layers for controlling communication and firmware for driving the MAC layers. The wireless communication controller unit 304 incorporates a flash ROM which can store a MAC address and the like.

These functional units shown in the block diagram of FIG. 3 are processed under the control of the CPU 315, and programs (drivers) controlled by the CPU 315 are stored in the ROM 316 or flash ROM 313. The firmware may be stored in a flash ROM or the like present in the wireless communication controller unit 304, or may be stored in the flash ROM 313 or ROM 316 of the printer 301 and loaded into the wireless communication controller unit 304 when the wireless interface is used. The flash ROM 313 stores parameters such as a network identifier ESSID and encryption key necessary for wireless communication. When the wireless interface is used, these parameter values are handed from the driver to the wireless communication controller to enable wireless communication.

The configuration of the digital cameras 101 and 102 and that of the printer 103 according to the first embodiment have been described. The wireless communication RF units 205 and 305 are equipped with antennas, but the antennas may not always protrude outside. Especially for a digital camera, portability is an important factor, and the antenna is desirably incorporated in or mounted on the surface instead of protruding outside.

In the first embodiment, the printer 103 forms an adhoc network, and the digital cameras 101 and 102 sequentially join the network in an order named. The digital camera 102 and printer 103 shift to the power save mode in an order named. The operation sequence of the printer 103 will be explained with reference to FIG. 4.

Figure 4:
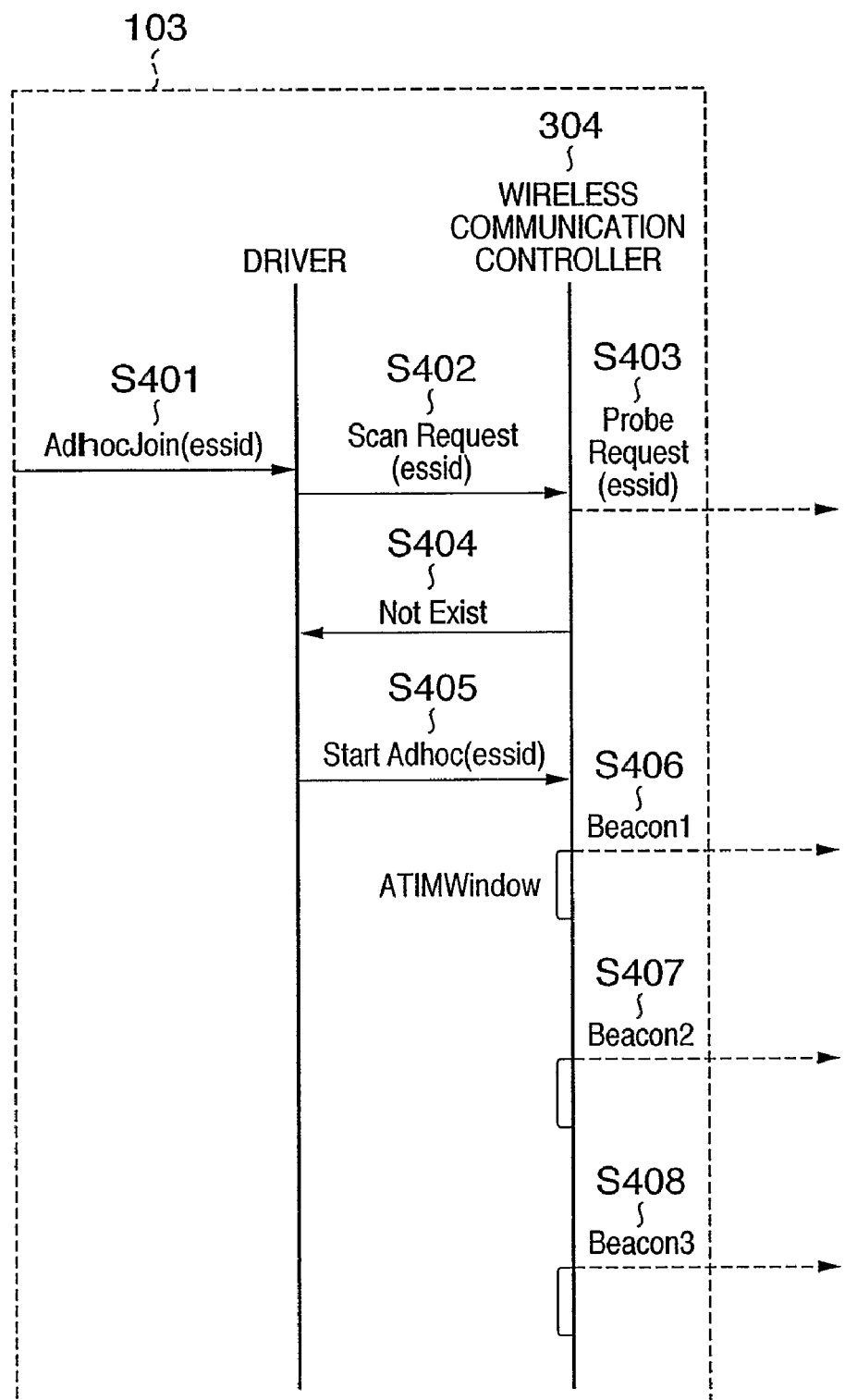
FIG. 4 is a sequence chart when the printer 103 generates an adhoc network according to the embodiment.

FIG. 4 shows, along the time axis, the sequence of commands between the device driver of the printer 103 and the wireless communication controller 304, and the sequence of frames which are emitted to the air as a result of processing the commands by the wireless communication controller 304 and wireless communication RF unit 305.

An application program which runs by the CPU 315 of the printer 103 designates an ESSID and issues to the device driver a request to join an adhoc network (S401). In FIG. 4, the ESSID is SaveNet. The driver scans in order to confirm whether there is an adhoc network whose ESSID is SaveNet. Scanning is achieved by issuing a series of commands to the wireless communication controller 304 (S402).

The commands are processed by the wireless communication controller 304 and wireless communication RF unit 305, and Probe Request is transmitted to the air (S403). However, no response is sent back because a station (STA) which operates with the ESSID "SaveNet" does not exist on the network. If the wireless communication controller 304 does not receive any response for a predetermined period, it generates timeout and notifies the driver of a message to this effect (S404). The driver issues to the wireless communication controller 304 a series of commands to generate an adhoc network having the ESSID "SaveNet" (S405). At this time, the CPU 315 of the printer 103 designates a positive value (which is much smaller than the beacon interval) for a variable ATIM Window which allows the use of the power save mode. After the setting in S405 ends, beacons are cyclically transferred.

According to the IEEE 802.11 standard, a beacon signal can transmit various types of information such as a network identifier IBSS (Independent Basic Service Set), beacon cycle, and ATIM Window length. STAs which join the network must always be awake (Awake state) in only the ATIM Window period immediately after a beacon is transmitted or received. The types of packets which can be transmitted during the ATIM Window period are limited, and control frames (RTS (Request To Send), CTS, ACK, and the like) and management frames (Probe Request, ATIM (Announcement Traffic Indication Message), and the like) are permitted.

Figure 5:
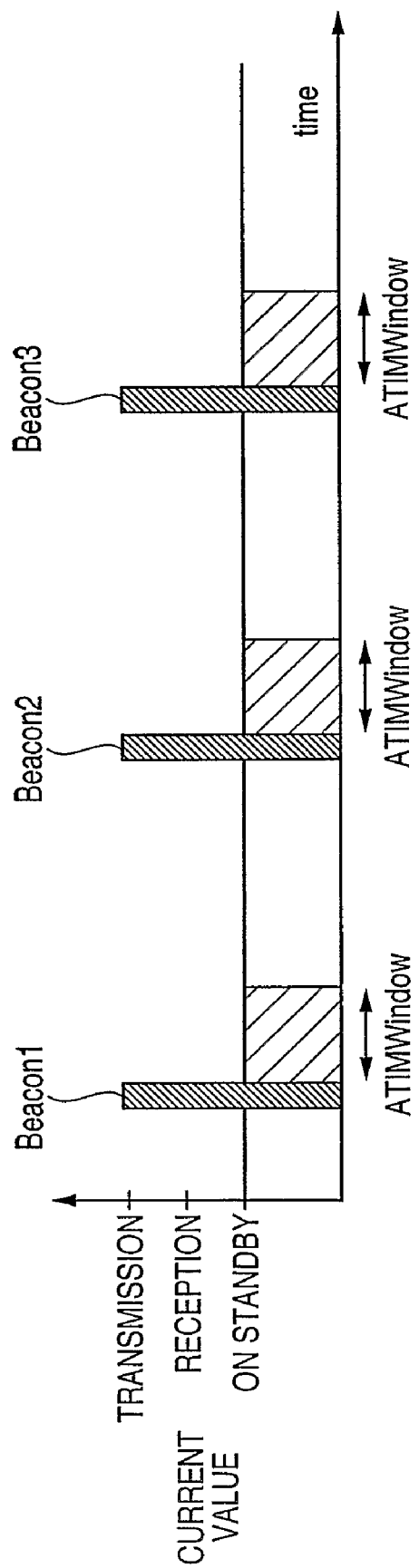
FIG. 5 is a timing chart showing the current value in the sequence of FIG. 4.

FIG. 5 shows the relationship between the time and the current value which is consumed by the wireless interface of the printer 103 during the beacon (S406 to S408) period. FIG. 5 reveals that the ATIM Window period follows transmission of a beacon. The printer 103 is in the active mode, and requires standby power of a given magnitude in a normal state. Since packet transmission/reception requires a large current, a large current value is necessary for beacon transmission.

A sequence when the digital camera 101 joins an adhoc network generated by the printer 103 will be explained with reference to FIG. 6. An application program which runs by the CPU 215 of the digital camera 101 issues to the device driver a request to join an adhoc network having the ESSID "SaveNet" (S601). The driver scans in order to confirm whether SaveNet exists. Scanning is achieved by issuing a series of commands to the wireless communication controller 204 (S602). The commands are processed by the wireless communication controller 204 and wireless communication RF unit 205, and Probe Request is transmitted to the air (S603).

Since the printer 103 has already formed an adhoc network by designating SaveNet as an ESSID, the printer 103 sends back Probe Response (S604). The wireless communication controller 204 hands information obtained by Probe Response to the driver (S605). As a result, the driver detects that the adhoc network having the ESSID "SaveNet" exists, and issues a series of commands to join the adhoc network to the wireless communication controller 204 (S606). After the setting in S606 ends, either of the printer 103 and digital camera 101 transfers a beacon in a predetermined cycle (S607).

In the ATIM Window period immediately after a beacon is transmitted or received, the digital camera 101 keeps the Awake state even if it shifts to the power save mode, in order to operate in accordance with ATIM Window designated by the printer 103. When the digital camera 101 transmits print data to the printer 103, transmission must be done after the ATIM Window period. S608 to S613 represent data transmission and an ACK to the data.

A sequence when the digital camera 102 joins SaveNet by the printer 103 and then shifts to the power save mode will be explained with reference to FIG. 7. A sequence up to joining of the digital camera 102 in an adhoc network generated by the printer 103 is the same as that in S601 to S606, and is not illustrated in FIG. 7. After joining in SaveNet, the application program of the digital camera 102 notifies the driver of a request to shift to the power save mode (S701). The driver issues a series of commands to shift to the power save mode to the wireless communication controller 204 (S702). Upon accepting these commands, the wireless communication controller 204 blocks the process till the next beacon timing. After the wireless communication controller 204 receives the next beacon (S703), it broadcasts an ATIM packet indicating that the digital camera 102 is to shift to the power save mode in the ATIM Window period (S704).

Figure 8:
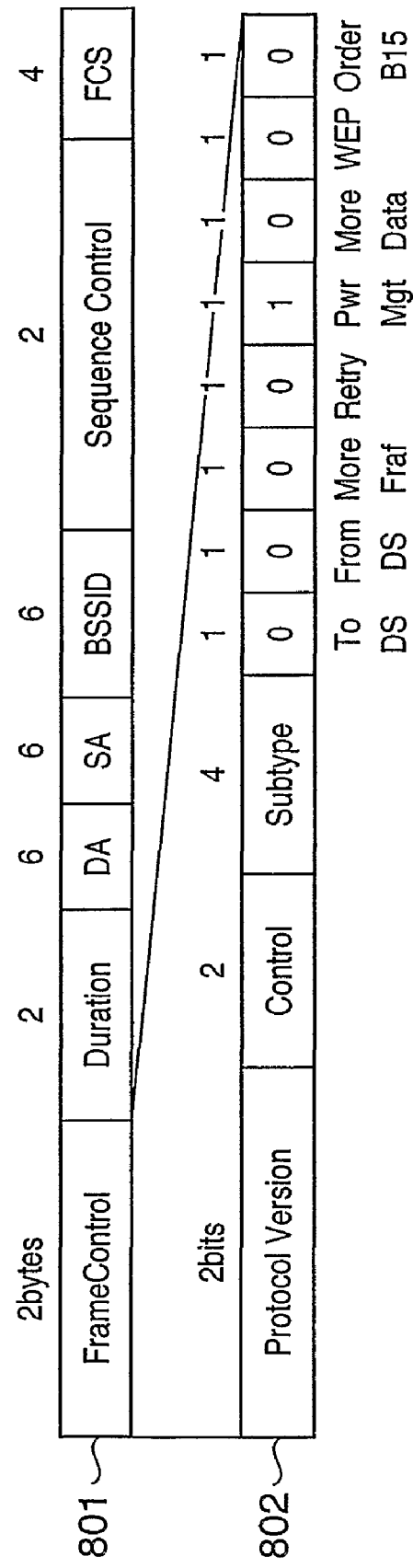
FIG. 8 is a view showing the frame format of an ATIM packet.

The frame format of the ATIM packet at this time is represented by 801 in FIG. 8. The destination address (DA) of the ATIM packet is a broadcast address (or multicast address receivable by all STAS). The source address (SA) is a MAC address held by the wireless interface of the digital camera 102. As the BSSID, a BSSID determined by the printer 103 upon forming an adhoc network is set. The BSSID takes the same value for all beacons transferred over the network, and can be acquired from beacon 1 (S703) or the like. The more detailed format of FrameControl is represented by 802. The ATIM packet defines that the control bits are 00, and the subtype field holds 1001. In this case, the PwrMgt (PM: Power Management) bit is set to 1 to represent that the power save mode is set ON.

With this setting, the digital camera 102 can notify all STAs (printer 103 and digital camera 101) present on the adhoc network that the digital camera 102 has changed to the power save mode. A result "OK" from the wireless communication controller 204 is transferred up to the host application (S705 and S706).

A process when the printer 103 notifies the digital camera 102 that the printer 103 is to shift to the power save mode will be explained. When the printer 103 is to shift to the power save mode, it broadcasts in the ATIM Window period an ATIM packet in which the PM bit is set to 1, similar to the digital camera 102 as described above. If the wireless communication controller 204 receives the broadcast ATIM packet in the ATIM Window period (S709), it issues an event by an interrupt, and notifies the driver that a given STA (printer 103) has changed its power mode (S710).

The driver saves a power save list 1001 (FIG. 10) representing the MAC address of a STA which is in the power save mode. The digital camera 102 does not register any MAC address before receiving a change in the power mode of a STA in S710, and registers the MAC address of the printer 103 upon reception of the change in the power mode of the STA.

The expiration time is also stored as information accessory to the MAC address. The expiration time is decremented in a predetermined cycle, and when it comes to 0, a corresponding MAC address is deleted from the power save list 1001. The expiration time is employed to obviate the need for holding unnecessary information indefinitely when the printer 103 suddenly abnormally stops and wireless communication fails or when a communication partner moves to a location where no radio wave reaches.

The driver receives the change in the power mode of the STA in S710, registers it in the power save list 1001, and then issues a command which notifies the wireless communication controller 204 that the printer 103 has changed to the power save mode (S711). Since this command requires the MAC address of the printer 103, the wireless communication controller 204 unicasts an ATIM packet to the printer 103 prior to data transmission upon receiving, from the driver, data to be transmitted to the MAC address of the printer 103.

In S712, the driver receives a data transmission request from the CPU 215 of the digital camera 102. In S713, the driver converts the request into a command addressed to the wireless communication controller 204, and issues the command. Upon reception of the data and command, the wireless communication controller 204 confirms that the address of the packet is the MAC address registered in S711, and waits for the reception or transmission time of a beacon (S714). At the end of receiving or transmitting a beacon, the wireless communication controller 204 unicasts an ATIM packet to the printer 103 in the ATIM Window period (S715). Upon reception of the ATIM packet, the printer 103 sends back an ACK (S716), and changes to the Awake mode in the beacon period. The printer 103 can receive a data packet in S717, and sends back an ACK (S718). Data is normally transmitted through S719 and S720.

A sequence when the printer 103 issues a request to change from the power save mode to the active mode will be described. The printer 103 uses a broadcast ATIM packet (or multicast ATIM packet receivable by all STAs), changes the PwrMgt bit to 0, and transmits the ATIM packet (S723). Since this packet can be received by all STAs in the network and undergoes the same process, operation of the digital camera 102 will be typified.

Upon reception of the ATIM packet in S723, the wireless communication controller 204 of the digital camera 102 issues an event by an interrupt, and notifies the driver of the MAC address and PM bit value of the printer 103 (S724). The driver confirms that the PM bit is 0, and deletes an item corresponding to the MAC address of the printer 103 from the power save list 1001. When the driver receives a MAC address which has not been registered in the power save list 1001, it ignores the MAC address.

After that, a command which notifies the wireless communication controller 204 that the MAC address of the printer 103 changes to represent the active mode is issued to the wireless communication controller 204 (S725). Hence, the wireless communication controller 204 need not transmit any ATIM packet for data to be transmitted to the MAC address, and rapidly transfers the data.

Figure 11:
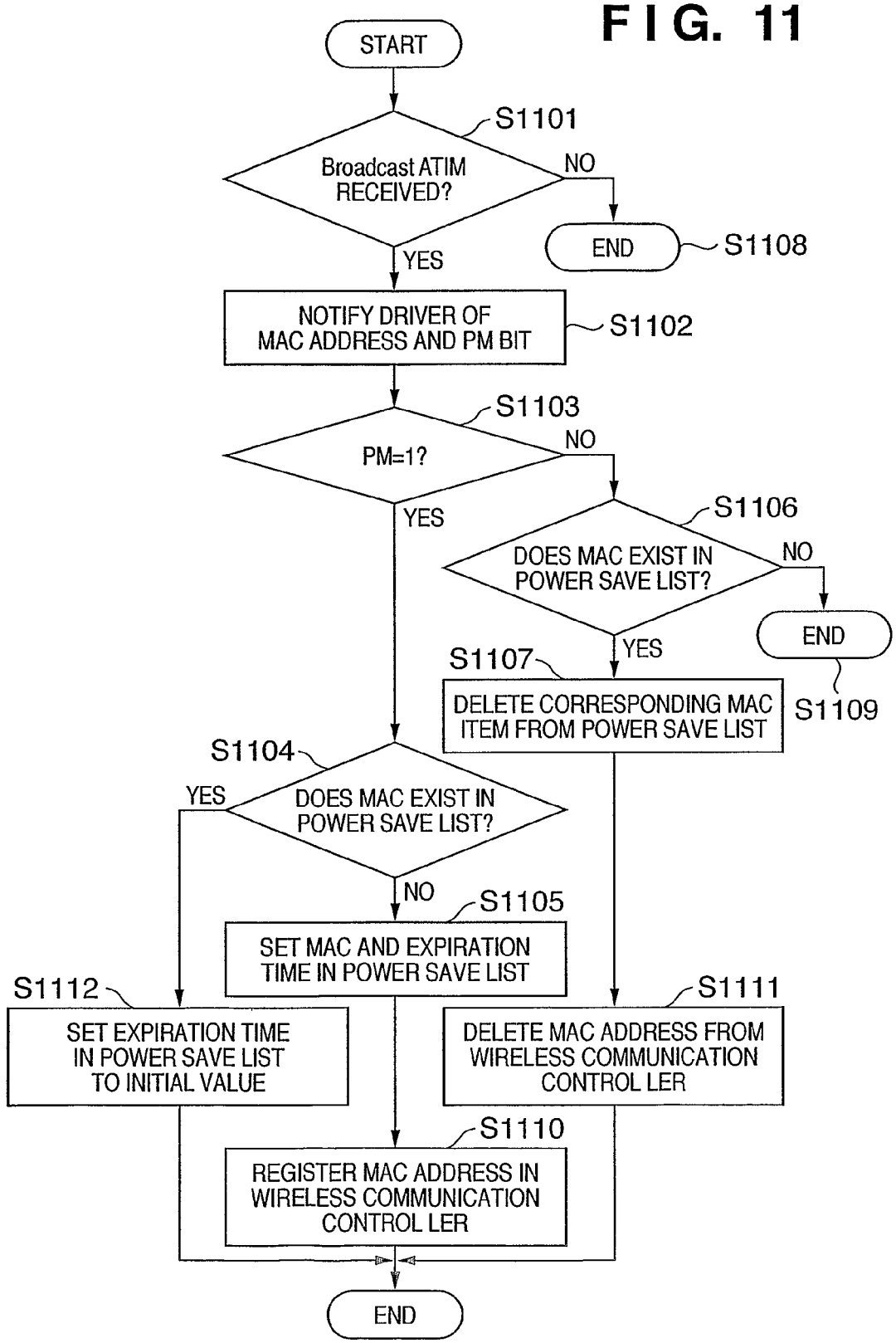
FIG. 11 is a flowchart showing a power save list update algorithm according to the first embodiment.

FIG. 11 shows the algorithm of registration in the power save list 1001 and deletion from it. If a broadcast ATIM packet is received during the ATIM Window period (S1101), the driver is notified of information on the MAC address and PM bit in the ATIM packet (S1102). If the PM bit is 1, this means that the transmitting side is to shift to the power save mode. In S1103, it is confirmed whether the PM bit is 1. If the PM bit is 1, it is confirmed whether the MAC address exists in the power save list 1001. If the MAC address exists in the power save list 1001, the expiration time is set to an initial value (S1112). If no MAC address exists, the MAC address and expiration time are registered in the power save list 1001 (S1105). The wireless communication controller is notified of the MAC address to register the MAC address in the wireless communication controller (S1110).

If the PM bit is not 1 but 0 in S1103, this means that the transmitting side is to shift to the active mode. In S1106, it is confirmed whether the notified MAC address exists in the power save list 1001. If the MAC address exists, a corresponding MAC address item is deleted in S1107. Then, the MAC address is deleted from the wireless communication controller (S1111). If no MAC address exists, the process directly ends (S1109).

The expiration time can be utilized in several ways. As the simplest method, the maximum time during which the power save mode continues is defined, and each STA transmits once in the maximum time a broadcast ATIM packet which notifies other STAs of the current power mode of the STA. According to the algorithm in FIG. 11, the expiration time is set to an initial value every time a broadcast ATIM packet in which the PM bit is set is received.

In addition to the method of detecting the broadcast ATIM packet, it may be detected whether any data is received from a MAC address registered in the power save list 1001, and the expiration time may be returned to an initial value. In this case, an unnecessary procedure of transmitting a broadcast ATIM packet which notifies STAs of the power mode can be omitted.

In the above embodiment, a broadcast ATIM packet is received, the driver is notified that the broadcast ATIM packet has been received (S710 and S724), and then registration in the power save list and deletion from it are executed. As another embodiment, these procedures may be executed in the wireless communication controller 204.

Figure 7:
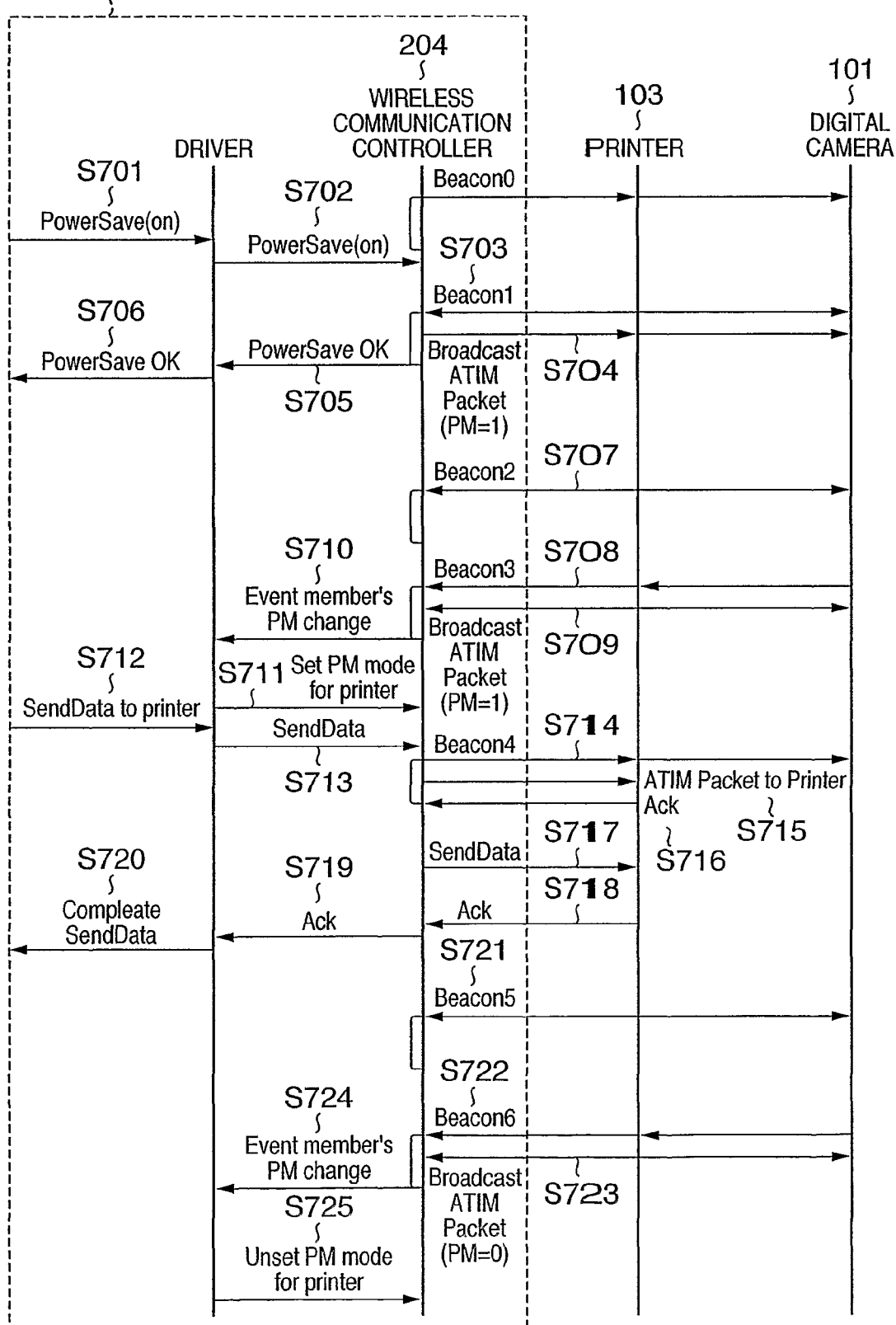
FIG. 7 is a sequence chart by a digital camera 102 according to the first embodiment.
Figure 9:
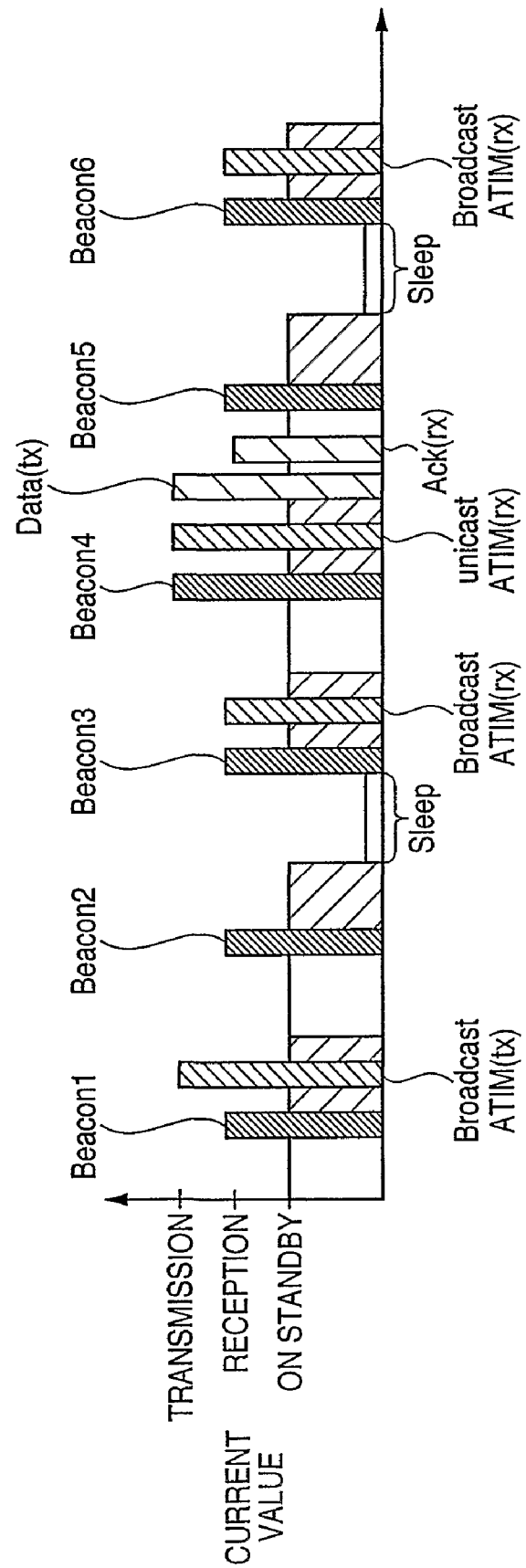
FIG. 9 is a timing chart showing the current value in the sequence of FIG. 7.

FIG. 9 shows the relationship between the time and the current value which is consumed by the wireless interface of the digital camera 102 in the periods of beacons 1 to 5 in FIG. 7 in order to check the effect of the power save mode and the effect on power consumption when a broadcast ATIM packet is transmitted/received. The power consumption level includes four levels: "on standby", "during reception", "during transmission", and a Sleep state (doze state) which is set after the end of the ATIM Window period in the power save mode. In FIG. 9, transmission requires a larger power than reception, and almost no current is necessary in the Sleep state. According to the IEEE 802.11 standard, the Awake state must be kept till the end of the beacon period when an ATIM packet is transmitted or received.

In FIG. 9, the digital camera 102 transmits a broadcast ATIM packet (S703) upon reception of beacon 1, and shifts to the power save mode. The digital camera 102 must keep the Awake state till the end of the cycle of beacon 1. The digital camera 102 receives beacon 2, and upon the lapse of the ATIM Window period, shifts to the Sleep state. Since the digital camera 102 must change to the Awake state in the ATIM Window period, it changes to the Awake state after beacon 3, and receives a broadcast ATIM packet (S709) from the printer 103. After beacon 4, the digital camera 102 transmits an ATIM packet to the printer 103 in order to transmit data to the printer 103 (S715). After the end of the ATIM Window, the digital camera 102 transmits data (S717), and receives an ACK (S718). After beacon 6, the digital camera 102 receives from the printer a broadcast ATIM packet for changing to the active mode (S723), and keeps the Awake state till the end of the beacon period.

As described above, when the power mode is changed, an ATIM packet is broadcast. To manage the power mode of a partner, the PM bit of a broadcast ATIM packet is checked.

This can prevent transmission of data while a communication partner is in the Sleep state because its power mode is not known. This effect is significant because all packets are lost when packets are transmitted to a partner in the Sleep state.

A STA in the power save mode among all STAs on the network can be easily grasped by sending a power mode switching notification by a broadcast ATIM packet. Also, all STAs can be notified of switching of the power mode.

Since no special packet is transmitted over the adhoc network in connection, it is difficult to determine which STA has joined the network (in the adhoc mode, connection must be done in the active mode). In the first embodiment, only a STA which has changed to the power save mode is managed in the power save list by each STA, and information on an active STA is not held. This management method can advantageously obviate the need for strictly managing the number of STAs present on the network.

Further, robustness can be improved by adding the expiration time to the power save list in order to avoid mismatch of the state owing to a sudden failure, a change in radio environment, disconnection of radio waves upon movement, or the like.

By notifying STAs of a change in power mode by using an ATIM packet, the STAs can be notified of a change in power mode when all STAs in the network are in the Awake state, and can be given a chance to notify STAs of a change in power mode in each beacon cycle. In other words, STAs can be reliably, rapidly notified of a change in power mode.

Second Embodiment

In the first embodiment, the fact that all STAs in an adhoc network are in the Awake state during the ATIM Window period is utilized, and the STAs are notified of a change in power mode by broadcasting an ATIM packet. According to this method, however, all STAs receive an ATIM packet, and even a STA in the power save mode must change to the Awake state in the beacon period, wasting power.

Of STAs in the adhoc network, only a STA which is to transmit a packet need to know the power mode of a receiving STA. If the transmitting STA does not communicate with STAs except the receiving STA, the power modes of the remaining STAs need not be managed.

In general, an application protocol establishes connection with a communication partner, exclusively communicates with the partner, and then ends the connection. That is, after communication partners are defined, they communicate with each other for a given period, and hardly communicate with another STA with which no connection is established. According to the second embodiment, a driver and wireless communication controller are explicitly instructed on STAs which are to communicate with each other, and only the STAs can mutually notify a change in power mode.

In the second embodiment, similar to the first embodiment, a printer 103 forms an adhoc network, and digital cameras 101 and 102 sequentially join the network in an order named. The digital camera 102 and printer 103 shift to the power save mode in an order named.

Figure 6:
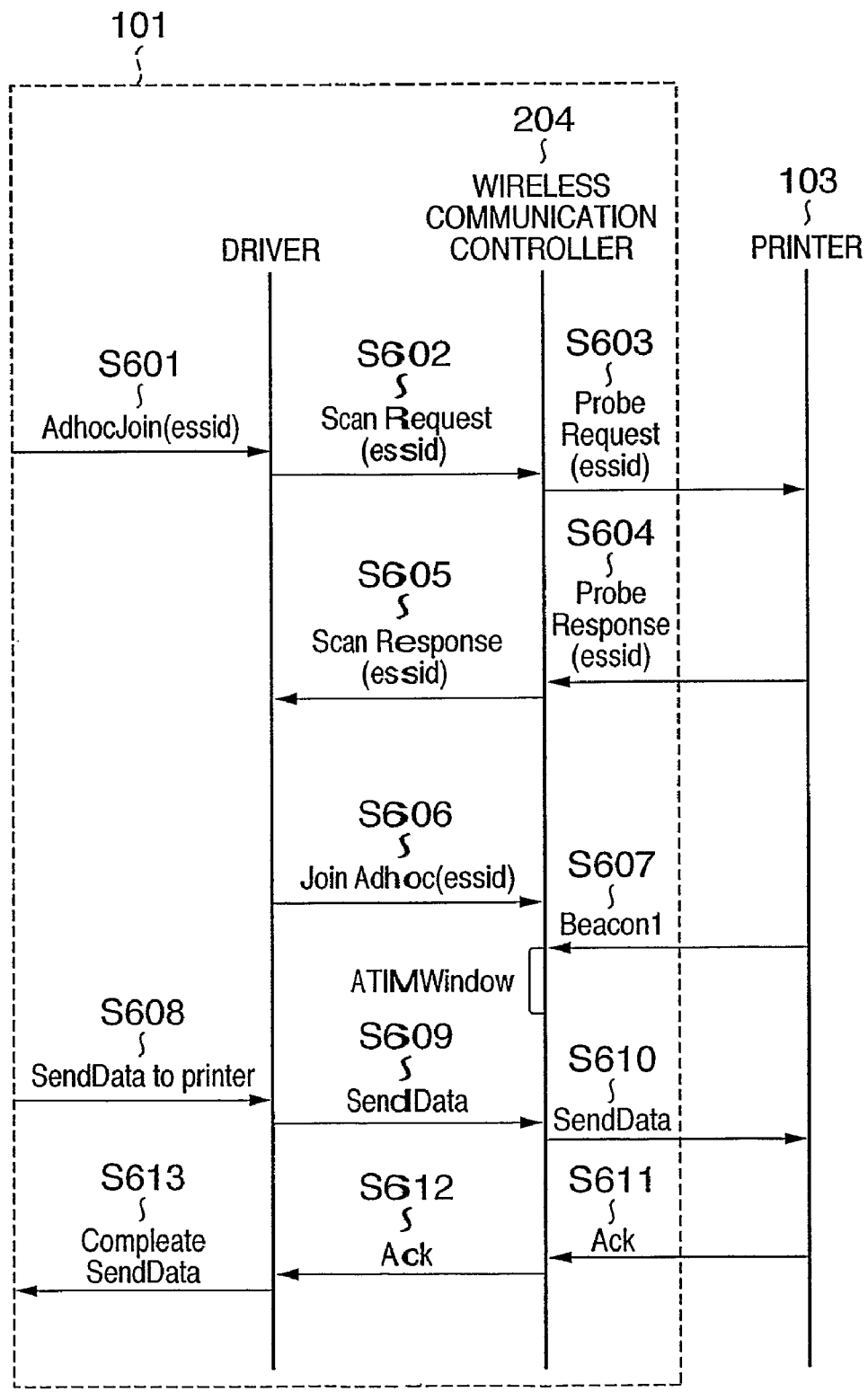
FIG. 6 is a sequence chart when the digital camera 101 joins a network according to the embodiment.

A sequence when the printer 103 sets the ESSID to SaveNet and generates an adhoc network is the same as that in FIG. 4, a sequence when the digital camera 101 joins SaveNet is the sane as that in FIG. 6, and a description thereof will be omitted.

Figure 12:
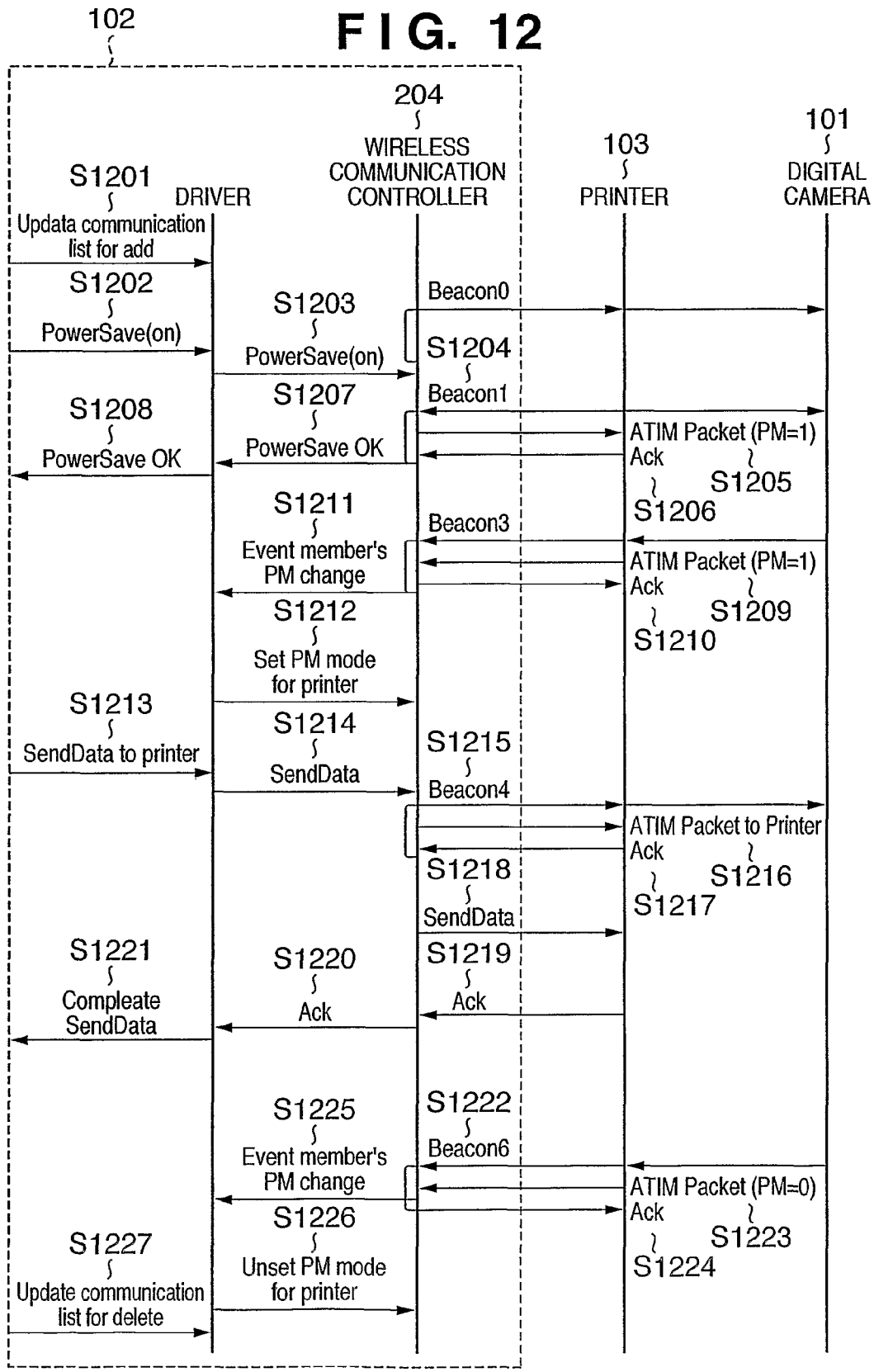
FIG. 12 is a sequence chart by a digital camera 102 according to the second embodiment.

A sequence when the digital camera 102 joins SaveNet is the same as S601 to S606 in FIG. 6, and a subsequent process will be explained with reference to FIG. 12. An application program which runs by a CPU 215 of the digital camera 102 starts communication upon establishing connection such as TCP connection. Before connection is established, the application program notifies the driver of the MAC address of a partner (S1201). This timing depends on a communication protocol used, and may be set before a session is established (the first TCP connection starts) in the FTP or the like which uses two TCP connections.

When the driver acquires the MAC address of the communication partner in S1201, a communication list 1301 is used instead of the power save list 1001 adopted in the first embodiment (FIG. 13). The communication list 1301 is different from the power save list 1001 in that the list 1301 represents a list of communication partners and manages not only STAs in the power save mode but also those in the active mode. If the driver is notified of the MAC address of the printer 103 in S1201, the active mode as the value of the power mode and the initial value of the expiration time are registered. Similar to the first embodiment, the expiration time is employed to obviate the need for holding unnecessary information indefinitely when the printer suddenly abnormally stops and wireless communication fails or when a communication partner moves to a location where no radio wave reaches.

Upon the completion of registration in the communication list 1301, the application program of the digital camera 102 transmits to the driver a request to shift to the power save mode (S1202). The driver issues a series of commands to shift to the power save mode to a wireless communication controller 204 (S1203). Upon accepting these commands, the wireless communication controller 204 blocks the process till the next beacon timing. Upon reception of the next beacon (S1204), the wireless communication controller 204 unicasts, to all MAC addresses in the communication list, an ATIM packet indicating that the digital camera 102 is to shift to the power save mode in the ATIM Window period. In the second embodiment, the wireless communication controller 204 transmits the ATIM packet to only the printer 103 (S1205). Since the ATIM packet is unicast, an ACK is sent back (S1206).

The frame format of the ATIM packet at this time is represented by 801 in FIG. 8. The destination address (DA) of the ATIM packet is the MAC address of the printer 103. The source address (SA) is a MAC address held by the wireless interface of the digital camera 102. As the BSSID, a BSSID determined by the printer 103 upon forming an adhoc network is set. The BSSID takes the same value for all beacons transferred over the network, and can be acquired from a beacon (S1204) or the like. The more detailed format of FrameControl is represented by 802. The ATIM packet defines that the control bits are 00, and the subtype field holds 1001. In this case, the PwrMgt (PM) bit is set to 1 to represent that the power save mode is set ON.

With this setting, the digital camera 102 can notify the printer 103 that the digital camera 102 has changed to the power save mode. A result "OK" from the wireless communication controller 204 is transferred up to the host application (S1207 and S1208).

A process when the printer 103 notifies the digital camera 102 that the printer 103 is to shift to the power save mode will be explained. When the printer 103 is to shift to the power save mode, it transmits an ATIM packet in which the PM bit is set to 1 to the MAC address of the digital camera 102 that is registered in the communication list managed by the printer 103. If the wireless communication controller 204 receives the unicast ATIM packet in the ATIM Window period (S1209), it issues an event by an interrupt, and notifies the driver that a given STA has changed its power mode (S1211).

The driver updates the communication list 1301 on the basis of accessory information on the MAC address and PM bit which is transmitted in S1211. The driver confirms whether a corresponding MAC address exists in the communication list 1301. If no corresponding MAC address exists, the driver determines the power mode from the notified PM bit, and registers the determined power mode and expiration time in the communication list 1301 in correspondence with the notified MAC address. If a corresponding MAC address exists in the communication list 1301 and the notified PM bit is 1, the driver changes a power mode value corresponding to the MAC address in the communication list 1301 to the power save mode. If the PM bit is 0, the driver changes the power mode value to the active mode. In either case, the expiration time is returned to an initial value. The expiration time can be utilized in several ways, and can be used by the same method as that in the first embodiment.

When the power mode value of the communication list 1301 shifts from the active mode to the power save mode, the driver issues a command (S1212) which notifies the wireless communication controller 204 that the printer 103 has changed to the power save mode. Since this command requires the MAC address of the printer 103, the wireless communication controller 204 unicasts an ATIM packet to the printer 103 prior to data transmission upon receiving, from the driver, data to be transmitted to the MAC address of the printer 103.

More specifically, in S1213, the driver receives a data transmission request from the digital camera 102. In S1214, the driver converts the request into a command addressed to the wireless communication controller 204, and issues the command. The wireless communication controller 204 receives the data and command, and if the destination of the data is the registered MAC address, waits for the reception or transmission time of a beacon (S1215). In this case, the digital camera 102 comes to its turn to transmit a beacon, thus transmits a beacon (S1215), and transmits a unicast ATIM packet to the printer 103 in the ATIM Window period (S1216). It should be noted that the PM bit is set to 1 and an ATIM packet is transmitted at this time. Thereafter, the printer 103 sends back an ACK (S1217). Upon reception of the ATIM packet, the printer 103 changes to the ATIM Window in the beacon period. The printer 103 can receive a data packet in S1218, and sends back an ACK (S1219). Data is normally transmitted through S1220 and S1221.

A sequence when the printer 103 issues a request to change from the power save mode to the active mode will be described. The printer 103 uses a unicast ATIM packet, changes the PM bit to 0, and transmits the ATIM packet.

Upon reception of the ATIM packet in S1223, the wireless communication controller 204 issues an event by an interrupt, and notifies the driver of the MAC address and PM bit value of the printer 103 (S1225). The driver confirms whether a corresponding MAC address exists in the communication list 1301. If no corresponding MAC address exists, the driver determines the power mode from the notified PM bit, and registers the determined power mode and expiration time in the communication list 1301 in correspondence with the MAC address notified by the wireless communication controller 204. If the MAC address exists and the notified PM bit is 0, the driver confirms whether a power mode corresponding to the MAC address of the printer 103 in the communication list 1301 is the power save mode. If the power mode in the communication list 1301 is the power save mode, the driver changes the power mode to the active mode, and requests the wireless communication controller 204 to cancel the registered MAC address (S1226). If the power mode in the communication list 1301 is already the active mode, the driver ignores the PM bit. Accordingly, the wireless communication controller 204 need not transmit any ATIM packet for data to be transmitted to the MAC address, and rapidly transfers the data.

When data transfer by the application ends and a corresponding MAC address item is to be deleted from the communication list 1301, the CPU 215 issues the request to the driver (S1227). At this time, if the power mode value of the MAC address represents the power save mode, the CPU 215 requests the wireless communication controller 204 to delete a corresponding MAC address registered in the wireless communication controller 204. In this example, since the printer 103 is already in the active mode, this process can be skipped.

Figure 14:
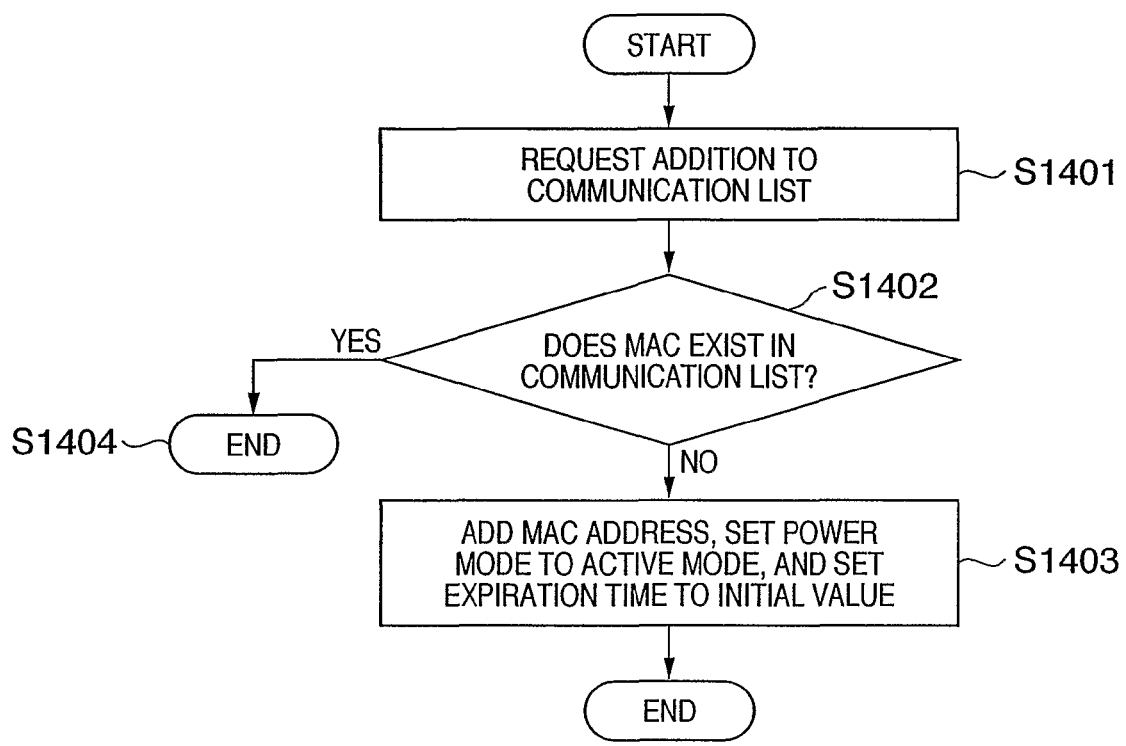
FIG. 14 is a flowchart showing a communication list update algorithm according to the second embodiment.
Figure 15:
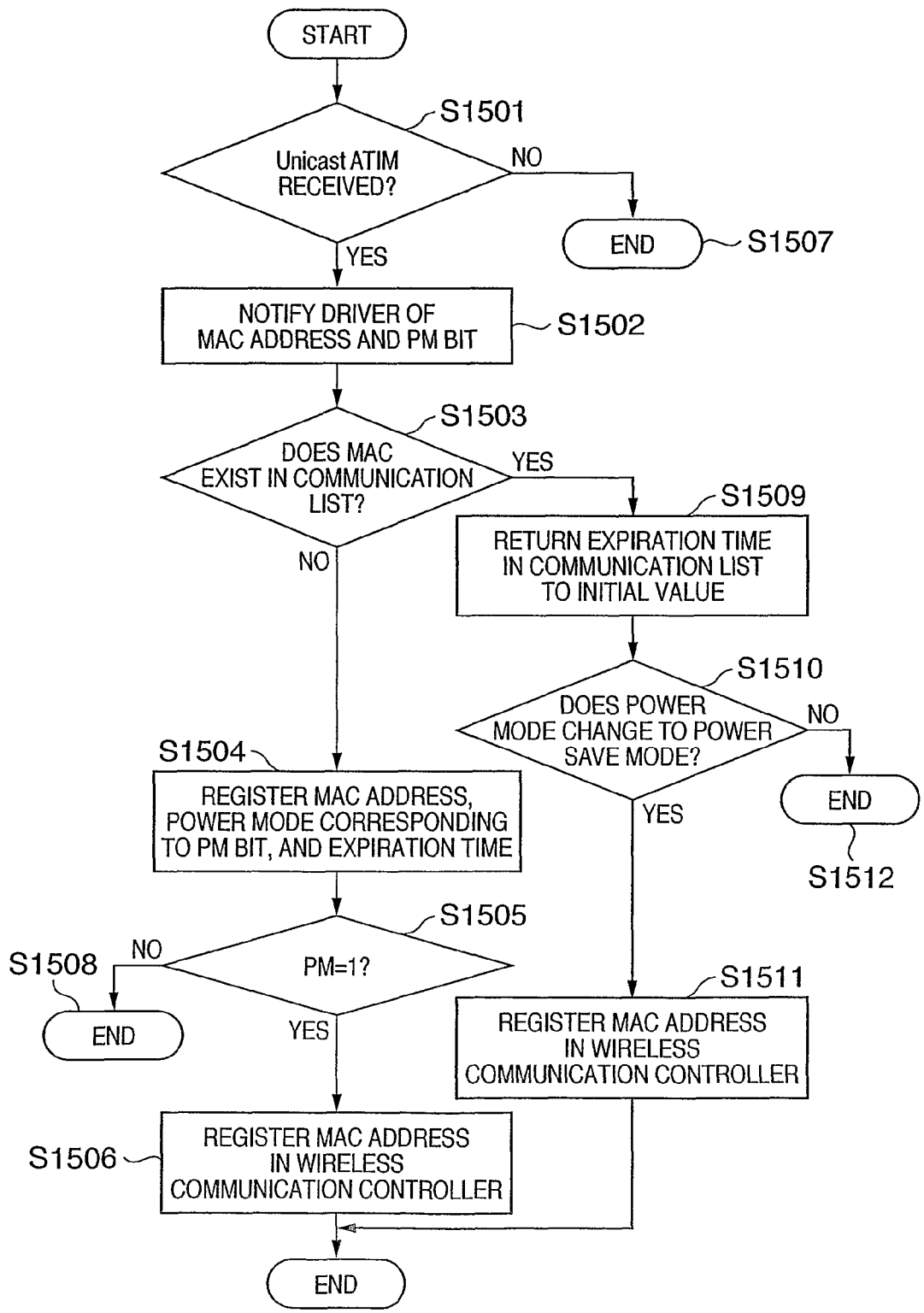
FIG. 15 is a flowchart showing the communication list update algorithm according to the second embodiment.

FIGS. 14 to 16 show the algorithm of registration in the communication list 1301 and deletion from it. FIG. 14 is a flowchart showing registration from an application in the communication list 1301. In S1401, an application which runs by the CPU 215 designates the MAC address of a communication partner, and issues a registration request to the communication list 1301. In S1402, it is confirmed whether the MAC address exists in the communication list 1301. If the MAC address has already existed, nothing is done (S1404); if no MAC address exists, the MAC address and power mode value are changed to the active mode, and the expiration time is set to an initial value (S1403).

An algorithm when the application issues a request to delete list contents registered in the communication list 1301 will be explained with reference to FIG. 16. In S1601, a MAC address is designated, and a request to delete the MAC address from the communication list 1301 is issued. In S1602, it is confirmed whether the designated MAC address exists in the communication list 1301. If no designated MAC address exists, nothing is done (S1604). If the designated MAC address exists, it is checked whether the power mode value represents the power save mode (S1603). If the power mode value represents the power save mode, a request to delete a corresponding MAC address from a MAC address list which is managed by the wireless communication controller 204 and transmits an ATIM packet before data transmission is issued to the wireless communication controller 204 (S1605). The MAC address is then deleted from the communication list 1301 (S1606). If the power mode value does not represent the power save mode in S1603, the corresponding MAC address is deleted from the communication list 1301 (S1606).

A process when a unicast ATIM packet is received from a STA in an adhoc network will be explained with reference to FIG. 15. If the wireless interface receives a unicast ATIM packet in S1501, the wireless communication controller notifies the driver of the MAC address of the transmitting side and the PM bit in the frame (S1502). The driver confirms whether the notified MAC address exists in the communication list 1301 (S1503). If the MAC address exists, the value of the expiration time corresponding to the MAC address is returned to an initial value (S1509). If it is determined from the transmitted PM bit to shift to the power save mode (PM bit is 1 and the previous power mode value represents the active mode), the MAC address is registered in the wireless communication controller (S1511). If the power mode has already shifted to the power save mode or it is determined from the transmitted PM bit to change to the active mode, nothing is performed (S1512).

If the designated MAC address has not been registered in S1503, a power mode corresponding to the PM bit value and the expiration time are registered in the communication list 1301 in correspondence with the MAC address (S1504). At this time, if the PM bit is 1, a command to register the MAC address is issued to the wireless communication controller 204 (S1506). If the PM bit is 0, nothing is done (S1508).

The above embodiment has separately described the means (S1201) of registration in the communication list and the means (S1202) of validating the power save mode. The same effects can also be obtained by designating which (one or a plurality of STAs) of STAs is notified when the power save mode is validated (S1202). Information on these devices may be deleted from the communication list when a request to change from the power save mode to the active mode is issued or the expiration time assigned to each device has elapsed.

The means (S1213) for transmitting data may also function as the means (S1201) for registration in the communication list and the means (S1202) for validating the power save mode. If no receiving side is registered in the communication list every time data is transmitted, an ATIM packet may be transmitted prior to data transmission and then data may be transmitted. With this process, a partner in data communication can always be notified of the power save mode.

In the above embodiment, after an ATIM packet is received, the driver is notified of a message that the ATIM packet has been received (S1211 and S1225), the power mode of the communication list is changed, and registration (S1212) of a MAC address in the wireless communication controller and deletion (S1226) of the MAC address from it are performed. As another embodiment, these procedures may be executed in the wireless communication controller 204.

Although the ATIM packet is utilized in the above embodiment, the same process may also be done using an RTS packet.

As described above, according to the second embodiment, compared to the first embodiment, a communication partner is explicitly designated by an application to prevent all STAs from changing to the Awake state when they receive a broadcast ATIM packet. Only communication partners can notify each other of a change in power mode.

Third Embodiment

In the first and second embodiments, the fact that all STAs in an adhoc network are in the Awake state during the ATIM Window period is utilized, and the STAs are notified of the power mode by broadcasting or unicasting an ATIM packet. According to this method, however, notification of the power mode must wait until the next beacon is communicated. The beacon interval is generally set to about 100 ms, and in the worst case, STAs cannot be notified of a change in power mode during the 100-ms period, and the control is blocked.

The third embodiment solves this problem. The state of a partner is detected, and if the partner is in the active mode, the partner can be quickly notified of the power mode without waiting for the next beacon time.

FIG. 17 is a sequence chart according to the third embodiment. Similar to the second embodiment, a sequence up to joining of a digital camera 102 in an adhoc network SaveNet generated by a printer 103, registration in a communication list (S1701), and issuing of a request to shift to the power save mode (S1702 and S1703) is the same as that in the first embodiment.

A method of determining whether a partner which is notified of the power mode is in the active mode will be described.

In FIG. 17, the printer 103 transmits a beacon in S1718, and must be in the active mode during the beacon period in accordance with the IEEE 802.11 standard. A wireless communication controller 204 stores this rule, and immediately when a destination which has been added to the communication list coincides with a destination to which a beacon has been transmitted, issues a power mode notification request.

The notification request uses a null data packet, unlike an ATIM packet used in the first and second embodiments (S1704). In designation of the null data packet, the control bits are 10, and the Subtype field holds 0100, as represented by 802 in FIG. 8. The PwrMgt (PM) bit is set to 1 to set the power save mode ON, and 0 to set the power save mode OFF. After that, an ACK is sent back (S1705), and a result "OK" from the wireless communication controller 204 is transferred up to the host application (S1706 and S1707).

Even if the printer 103 does not transmit any beacon in S1718, the wireless communication controller 204 may try to transmit a null packet in S1704 and expect to receive an ACK (S1705). If the wireless communication controller 204 does not receive any ACK response, it waits until the next beacon is received or transmitted. After the wireless communication controller 204 confirms that the printer 103 has transmitted a beacon, it transmits a null packet. If the wireless communication controller 204 cannot confirm any beacon from the printer 103, it transmits an ATIM packet to the printer 103, as described in the second embodiment. In this manner, the wireless communication controller 204 adopts a means for allowing the printer 103 to always receive a request to shift to the power save mode till the next beacon period.

To notify, of a change in power mode, a partner which is managed in the active state by the communication list, the partner may be notified of a change in power mode by a null packet before reception of a beacon regardless of whether the partner is a beacon transmitting side or not.

As described above, according to the third embodiment, compared to the first and second embodiments, when a communication partner is in the active mode, the timing when the power mode can be notified can be set early. Even if the communication partner is not in the active mode, it can be notified of the power mode till the next beacon period by also using the method of the second embodiment.

Other Embodiment

The first to third embodiments have been described in accordance with the IEEE 802.11 technical standard, and can also be widely applied to another technical standard other than IEEE 1302.11 as far as the same effects can be obtained.

In the first to third embodiments, all STAs join an adhoc network, and then STAs (in the embodiments, the digital camera 102) sequentially change to the power save mode.

Unlike this, for example, immediately when the digital camera 101 joins an adhoc network formed by the printer 103, it transmits a notification (broadcast ATIM, unicast ATIM, or null packet) for changing to the power save mode. When the digital camera 102 joins the network later, the printer 103 recognizes that the digital camera 101 is in the power save mode. However, the digital camera 102 does not know that the digital camera 101 is in the power save mode because the digital camera 102 joins the network after the information to this effect is transmitted.

To solve this problem, each STA may cyclically notify other STAs of its power mode. For example, in the first embodiment, a broadcast ATIM packet may be transmitted once every 10 beacon intervals. This allows a STA which joins a network later to acquire the power mode of a partner.

The above problem can also be solved by operating, with a user interface, each STA so as to shift to the power save mode after all STAs join a network, as an operation method of saving power in the adhoc mode.

As has been described above, the power mode can be rapidly, efficiently managed. For example, even a communication apparatus which performs adhoc communication can rapidly shift to the power save mode. Even when a device which forms an adhoc network changes to the power save mode, reception errors of a partner can be reduced.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-273132 filed on Sep. 21, 2004, which is hereby incorporated by reference herein.

The invention claimed is:

1. A communication apparatus that directly communicates with other apparatuses in a network without use of a base station, comprising:
a change unit constructed to change a power mode of the communication apparatus to a power save mode;
a determination unit constructed to determine a period during which an apparatus of the other apparatuses in the network in a power save mode will be awake;
a notification unit constructed to notify one or more apparatuses of the other apparatuses in the network of a change to the power save mode in the period determined by the determination unit, regardless of whether or not the one or more apparatuses are in the power save mode, when the power mode of the communication apparatus is changed to the power save mode by the change unit;
a receiving unit constructed to receive a notification of change to the power save mode from one or more apparatuses of the other apparatuses; and
a management unit constructed to manage the one or more apparatuses of the other apparatuses which transmitted the notification of change to the power save mode, as a power save apparatus in the power save mode.

2. The apparatus according to claim 1, wherein the notification unit sends a notification onto the network of the change to the power save mode by broadcast.

3. The apparatus according to claim 1, wherein the notification unit sends the notification to a specific apparatus in the network.

4. The apparatus according to claim 1, wherein the determination unit determines an ATIM (Announcement Traffic Indication Message) Window period.

5. The apparatus according to claim 1, wherein the notification unit notifies the one or more apparatuses of the change to the power save mode by using an ATIM (Announcement Traffic Indication Message) packet.

6. The apparatus according to claim 1, wherein the notification unit notifies the one or more apparatuses of the change of the power mode by using an RTS (Request To Send) packet.

7. The apparatus according to claim 1, further comprising:
a discrimination unit constructed to discriminate whether or not a partner apparatus transmitting a notification of change to the power save mode is an apparatus which transmitted a beacon signal before the notification,
wherein the notification unit notifies the partner apparatus of the change to the power save mode regardless of the period determined by the determination unit when the discrimination unit discriminates that the partner apparatus is an apparatus which transmitted a beacon signal before the notification.

8. The apparatus according to claim 7, wherein the notification unit notifies the partner apparatus of the change to the power save mode by using a null packet when the discrimination unit discriminates that the partner apparatus is an apparatus which transmitted a beacon signal before the notification.

9. A communication method performed by a communication apparatus that directly communicates with other apparatuses in a network without use of a base station, comprising:
a change step of changing a power mode of the communication apparatus to a power save mode;
a determination step of determining a period during which an apparatus of the other apparatuses in the network in a power save mode will be awake;
a notification step of notifying one or more apparatuses of the other apparatuses of a change to the power save mode in the period determined in the determination step, regardless of whether or not the one or more apparatuses are in the power save mode, when the power mode of the communication apparatus is changed to the power save mode at the change step;
a receiving step of receiving a notification of change to the power save mode from one or more apparatuses of the other apparatuses; and
a management step of managing the one or more apparatuses of the other apparatuses which transmitted the notification of change to the power save mode, as a power save apparatus in the power save mode.

10. A computer-readable storage medium on which is stored a computer program to cause a computer to control a communication apparatus that directly communicates with other apparatuses in a network without use of a base station, causing the computer to execute:
a change step of changing a power mode of the communication apparatus to a power save mode;
a determination step of determining a period during which an apparatus of the other apparatuses in the network in a power save mode will be awake;
a notification step of notifying one or more apparatuses of the other apparatuses of a change to the power save mode in the period determined in the determination step, regardless of whether or not the one or more apparatuses are in the power save mode, when the power mode of the communication apparatus is changed to the power save mode at the change step;
a receiving step of receiving a notification of change to the power save mode from one or more apparatuses of the other apparatuses; and
a management step of managing the one or more apparatuses of the other apparatuses which transmitted the notification of change to the power save mode, as a power save apparatus in the power save mode.

* * * * *